United States Patent [19]

Holka et al.

[11] 4,272,105
[45] Jun. 9, 1981

[54] PASSIVE SEAT BELT SYSTEM

[75] Inventors: Thomas C. Holka, Farmington Hills; Brian D. Marvin, Canton, both of Mich.

[73] Assignee: Ford Motor Company, Dearborn, Mich.

[21] Appl. No.: 97,251

[22] Filed: Nov. 26, 1979

[51] Int. Cl.³ ............................................. B60R 21/02
[52] U.S. Cl. .................................................... 280/804
[58] Field of Search ................................. 280/804, 802

[56] References Cited

U.S. PATENT DOCUMENTS

| 3,889,971 | 6/1975 | Kazaoka | 280/804 |
| 3,985,193 | 10/1976 | Akiyama | 280/802 |
| 4,193,613 | 3/1980 | Cachia | 280/804 |

Primary Examiner—Robert R. Song
Attorney, Agent, or Firm—John J. Roethel; Clifford L. Sadler

[57] ABSTRACT

A passive seat belt system having a torso belt that in passenger restraining position extends over upper torso of the seat occupant from a fixed roof rail attachment to a retractor mechanism anchored at the inboard side of occupant seating position. A trolley is movable along a track that in part parallels the vehicle roof rail and in part the windshield pillar at one side of the vehicle body. The trolley carries a "D" ring that engages the torso belt intermediate its ends. The trolley is movable along the track by a cable mechanism responsive to movement in door opening direction. As the trolley moves along the portion of the track paralleling the roof rail from the track end adjacent the roof rail attached end of the torso belt, the "D" ring automatically raises the torso belt forwardly and upwardly from restraining position. A hanger catch extends below the track prior to the point at which the track curves downwardly alongside of the windshield piller. The hanger catch is engaged by a flip hook carried on the torso belt, the flip hook being automatically raised into catch engagement by passage of the "D" ring along the torso belt.

5 Claims, 4 Drawing Figures

PASSIVE SEAT BELT SYSTEM

BACKGROUND OF THE INVENTION

The prior art discloses many permutations of automobile passive seat belt arrangements that basically comprise either a two-point or three-point system. The conventional two-point system has only a shoulder harness or torso belt, and the three-point system, a lap belt as well as the torso belt for restraining a seat occupant in a vehicle seating position. In nearly all of the disclosed passive seat belt arrangements, the seat occupant restraining position of the belt or belts is controlled by or related to the position of the vehicle door. That is, when the door is moved from an opened to a closed position, the belt or belts automatically embrace or encircle the seat occupant. When the door is moved from a closed to an opened position, the belt or belts are displaced from the seating position to facilitate egress or ingress from the vehicle passenger compartment. The term "passive", as used in the expression "passive seat belt system", thus means that the seat occupant is not required to do anything but close the car door to become belted in the seat or to open the door to become unbelted.

One objection to passive seat belt systems is the difficulty of raising and holding the belt or belts high enough off the seating position to maximize the ingress/egress clearance therebeneath. Preferably, at least the torso belt should be held substantially parallel to the roof rail from its point of attachment to the latter rearwardly of the occupant seating position to the point at which the roof rail is connected to the downwardly extending vehicle windshield piller framing the upper forward portion of the door opening. Reference may be made to U.S. Pat. No. 3,985,193 issued Oct. 12, 1976 to W. Akiyama et al for "Vehicle Semi-Passive Occupant Restraining Belt Arrangment" in which the torso belt can be held in the desired attitude along the roof rail, but must be manually positioned on a fixed hanger hook at the junction of the roof rail and the windshield pillar before the door is opened. The hook automatically releases the belt upon the door being closed.

It is an object of the present invention to provide a belt positioning system in which the torso belt is automatically picked up and held parallel to the roof rail as the door is opened and is automatically released to assume torso engirdling position as the door is closed.

SUMMARY OF THE INVENTION

In accordance with the present invention, there is provided a passive seat belt system having a torso belt one end of which is fixedly anchored to a vehicle body roof rail rearwardly of the outboard side of a vehicle occupant seating position, and the other end of which is connected to a seat belt retractor mechanism on the inboard side of the seating position. A trolley means is movable in response to door opening and closing movement along a track means. The trolley means has a belt engageable means engageable with the belt intermediate the ends of the latter. The track means has a portion paralleling the roof rail from the fixedly anchored end of the belt forwardly to a point at which the track means turns downwardly to parallel a vehicle windshield pillar located forwardly of the outboard side of the seating position. The trolley means during forward movement along the track means in response to door opening movement causes torso belt to be lifted upwardly and forwardly of the seating position to provide ingress and egress to the latter.

A belt hanger means extends below the track means contiguous to a point at which the track means departs from its parallelism to the roof rail and turns downwardly along the windshield pillar. A hanger engaging means carried on the torso belt is constructed and arranged to engage the hanger means to maintain a segment of the torso belt between its roof rail anchored end and the hanger means in substantially parallel relationship to the roof rail as the trolley means travels along the track means adjacent the windshield pillar.

DESCRIPTION OF THE DRAWINGS

Other advantages and features of the present invention will become more apparent as the description proceeds, reference being had to the accompanying drawings, wherein.

DETAILED DESCRIPTION OF THE INVENTION

Figure 1:
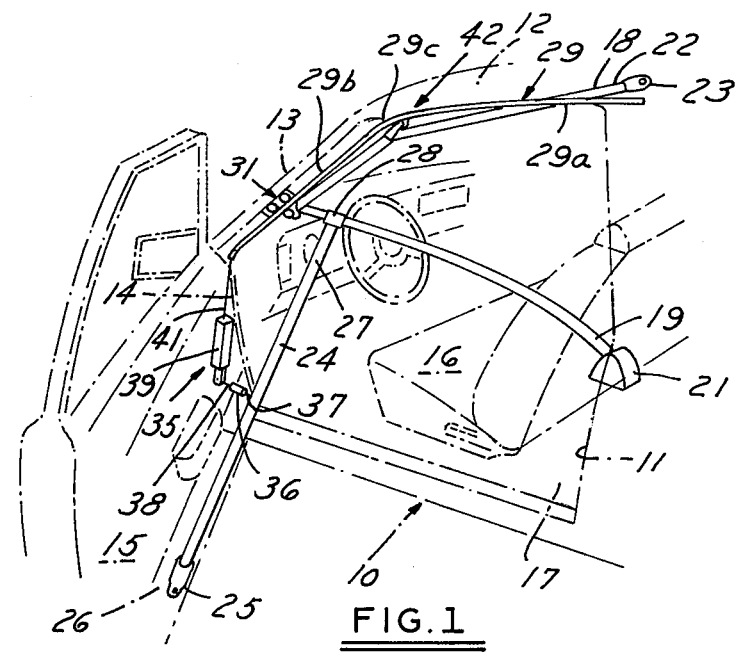
FIG. 1 is a perspective view of a portion of a vehicle body structure illustrating the orientation of a passive seat belt restraint system in door opened condition.

Referring now to the drawings, and more particularly to FIG. 1, the seat belt system embodying the present invention is shown as applied to a vehicle body 10 having a door opening 11 permitting ingress or egress to a passenger compartment. The door opening 11 is framed at its upper edge by a conventional roof rail structure 12 that extends longitudinally of the compartment and at its lower end by a windshield side pillar 13. The windshield side pillar 13 extends in a forwardly, downwardly inclined direction from the forward end of the roof rail structure 12 to the upper end of a vertical hinge pillar 14 to which a door 15 is hinged for swinging movement between opened and closed positions. The vehicle passenger seat is mounted in a conventional manner on a vehicle compartment floor 17.

The passive seat belt system disclosed is similar to that shown in U.S. application Ser. No. 076,711 filed by Thomas C. Holka et al on Sept. 18, 1979 for a "Passive Seat Belt Mechanism." That application is assigned to the assignee of the present application. The passive seat belt system comprises a three-point belt arrangement having a shoulder harness 18 anchored at its end 19 to a retractor mechanism 21 located at the inboard side of the passenger seating position on the vehicle floor 17. The opposite end 22 of the shoulder harness 18 is fixedly anchored by an attachment device 23 to the roof rail structure 12 at a point outwardly of and slightly rearwardly of the seat 16. The shoulder harness 18 in passenger restraining position extends over the upper torso of the seat occupant from the retractor mechanism 21 to the roof rail attachment device 23.

The lap belt 24 portion of the three-point belt arrangement is fixedly attached at one end 25 to a lower corner 26 of the door. The lap belt 24 at its opposite end 27 is coupled by a coupling device 28 to the shoulder harness 18 intermediate the ends of the latter.

Figure 2:
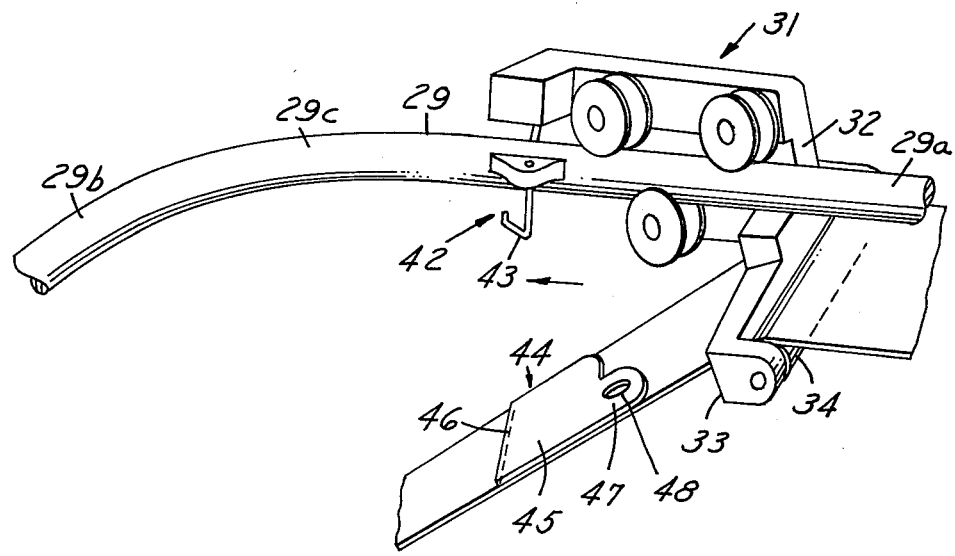
FIG. 2 is an enlarged perspective view of a trolley that travels along a track which parallels the vehicle body roof rail structure above the door opening, the trolley being depicted as it approaches a hanger means for holding a torso belt in lifted position against the roof rail.

A round track 29 is mounted within the vehicle compartment. The track 29 has a first section 29a paralleling the roof rail structure 12 from a position forwardly of the shoulder harness fixed anchor 23 to the junction of the roof rail and the windshield side pillar 13. The track then curves downwardly and has a second section 29b that follows the windshield side pillar 13. The track 29 terminates above the junction of the windshield side pillar 13 and the hinge pillar 14. Mounted on the track 29 is a tri-roller trolley 31, as best seen in FIG. 2. Depending from the frame 32 of the carriage 31 is a "D" ring having a roller 34 over which the belt passes, for a reason to be explained. The belt 18 is engaged by the "D" ring 33 intermediate the trolley 31 and the fixed shoulder harness anchor 23. The trolley 31 with the attached "D" ring 33 is moved along the track 29 by a drive system generally designated 35, as is more fully explained in the aforementioned U.S. application Ser. No. 076,711.

Briefly, the drive system 35 comprises a linearly compressible gas spring 36 mounted on a suitable bracket within the hinge pillar 14 and having a plunger or piston element 37 projected outwardly of one of its ends through an aperture in the hinge pillar into the vehicle door opening 11. The plunger 37 is coupled internally of the gas spring 36 to a flexible input cable 38 that passes around a guide pulley carried on the housing 39 of a displacement multiplying, multiple-sheave block (not visible) within the housing. An output cable 41 of the drive system 35 passes over a number of pulleys within the housing 39 and is routed through the windshield side pillar to the interior of the vehicle compartment roof and along the side roof rail to the rear of the passenger compartment where it is attached to the tri-roller trolley 31.

Assuming that the vehicle door is in a closed position, the torso belt 18 will extend from its roof anchorage 23 downwardly over the left shoulder of the seat occupant, across the occupant's upper torso and then down and around the occupant's right side to the floor mounted retractor mechanism 21. The lap belt 24 will extend from the door anchorage at the lower corner of the door, across the lower abdominal region of the seat occupant into close proximity to the retractor mechanism 21. The retractor mechanism is of any conventional inertia locking type. The trolley 31 will be at the rear end of the track section 29a.

If the occupant decides to exit the vehicle, the only active effort required on his part to cause release of the seat belt is to open the vehicle door. As the door begins to swing in an open direction, the drive system 35 causes the trolley 31 to be pulled forwardly along the track 29 with its ultimate destination being a terminal position near the windshield pillar 13. Because of this forward movement, the relationship of the carriage "D" ring to the torso belt causes the visible length of the latter to be greatly increased by protraction of the belt from the retractor mechanism 21.

Since the lap belt end 27 is coupled to the torso belt 18, it moves with the protracted portion of the latter toward the windshield side pillar 13. As seen in FIG. 1, the door opened condition, the lap belt 27 from the passenger compartment to its fixed door anchorage lies in a substantially parallel or close proximity relationship to the opened door. As the trolley moves forwardly along the portion 29a of the track that substantially parallels the vehicle roof rail, the belt passes over the roller 34 of the "D" ring. Since the torso belt 18 is under tension, a segment of the belt that is between the roller 34 and the anchorage point 33 is held in raised position in close proximity to the roof rail 12 at least until the trolley 31 begins its descent down the track portion 29a. Unless a mechanism is provided for holding the belt segment in raised position, the tendency would be for the belt to become stretched diagonally across the upper portion of the opening, thus interfering with ease of entry to or exit from the seating position; the maximum interference occurring when the trolley 31 is at its lowermost position on the track section 29b.

Figure 3:
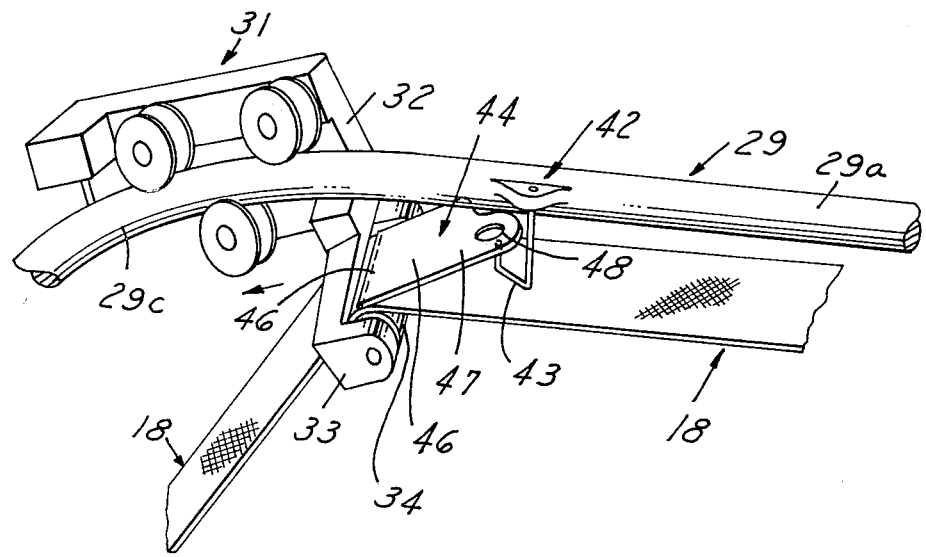
FIG. 3 is a view in part similar to FIG. 2 showing the trolley after it has passed the hanger means and is about to enter a downwardly turned portion of the track.

Referring now to FIGS. 2 and 3, a preferred mechanism for maintaining the belt segment in raised position across the top of the door opening is disclosed. The preferred mechanism comprises a belt hanger 42 that is in the form of a hook-like catch 43 which is mounted on and extends below track 29 contiguous to the curved section 29c at which point the track departs from its parallelism to the roof rail and turns downwardly to parallel the windshield pillar 13. The hanger catch 43 is adapted to be engaged by a flip hook 44. This flip hook 44 comprises a rigid plastic strip 45 that is substantially equal in width to the belt 18 and has a thickness less than the thickness of the belt 18. The strip 45 is hingedly secured to the upper surface of the torso belt 18 by a laterally extending stitch 46. At its free end opposite its stitched end, the strip has an extension 47 that is provided with a longitudinally extending aperture 48.

Figure 4:
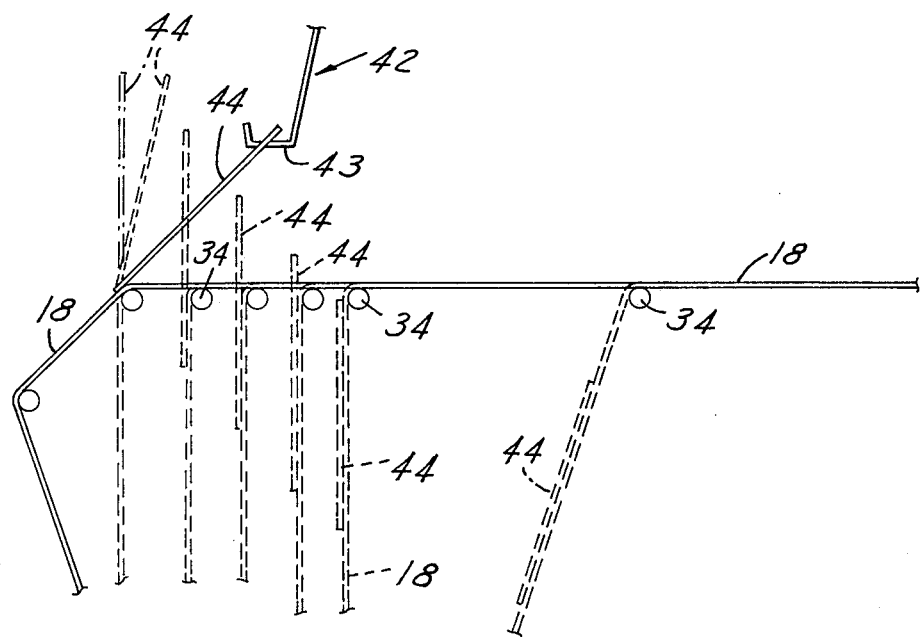
FIG. 4 is a diagramatic view of the sequence of movements of a hook means carried on the torso belt that results in engagement of the hook means with the hanger means.

As the trolley 31 approaches the downward curve 29c in the track 31, the flip hook 44 moves relatively up the belt towards the "D" ring roller 34, as shown in sequence in FIG. 4. As the roller 34 approaches a position beneath the hanger catch 43, a substantial portion of the flip hook 44 is above the belt level and positioned to skim beneath the catch 43. As the hinged end of the flip hook 44 passes over the "D" ring roller 34, the flip hook is tilted rearwardly. This movement accelerates as the trolley 31 begins its descent toward the track section 29b paralleling the windshield piller. The movement is such that the aperture 48 in the extension 47 on the flip hook 44 flips over the catch 43 and is retained thereon. The belt 18 segment between the flip hook and the end 22 fixedly attached to the roof rail 12 thus is held up against the roof rail providing maximum egress/ingress through the vehicle door opening to the seat 16.

The flip hook is released from the catch 43 by the return motion of the "D" ring upon the vehicle door being closed.

The retention of the belt in a raised position and its subsequent release from the raised position are automatic and occur without any action on the part of the vehicle occupant other than the opening and closing of the vehicle door which results in the passive operation of the seat belt system.

It is to be understood that this invention is not limited to the exact construction illustrated and described above, but that various changes and modifications may be made without departing from the spirit and scope of the invention as defined in the appended claims.

We claim:

1. A passive seat belt system having a torso belt, one end of which is fixedly anchored to a vehicle body roof rail rearwardly of the outboard side of a vehicle occupant seating position and the other end of which is connected to a seat belt retractor mechanism on the inboard side of the seating position, a trolley means movable in response to door opening and closing movement along a track means, belt engageable means on the trolley means engageable with the belt intermediate the ends of the latter, the track means having a portion paralleling the roof rail from the fixedly anchored end of the belt forwardly to a point at which the track means turns downwardly to parallel a vehicle windshield pillar located forwardly of the outboard side of the seating position, the trolley means during forward movement along the track means in response to door opening movement causing the torso belt to be lifted upwardly and forwardly of the seating position to provide egress or ingress to the latter, belt hanger means comprising a catch depending from the track means contiguous to a point at which the track means departs from its parallelism to the roof rail and turns downwardly along the windshield pillar, and hanger engaging means carried on the torso belt constructed and arranged to engage the hanger means to maintain a segment of the torso belt between its roof rail anchored end and the hanger means in substantially parallel relationship to the roof rail as the trolley means travels along the track means adjacent the windshield pillar, the hanger engaging means comprising a flip hook attached to the torso belt, the flip hook engaging the catch as the trolley means passes in belt lifting direction of movement.

2. A passive seat belt system according to claim 1, in which:

the catch depending from the track means is in offset relation to the longitudinal axis of the latter to prevent interference with the trolley means as the latter passes to and fro in response to door closing and door opening movement, and the flip hook comprises a substantially rigid planar member attached to the torso belt surface on a side of the torso belt facing the track means, the flip hook hooking on to the catch as the trolley means passes in belt lifting direction and unhooking from the catch as the trolley means passes in belt lowering direction.

3. A passive belt system according to claim 1, in which:

the belt engaging means on the trolley means comprises a "D" ring having a roller thereon that rolls beneath the underside of the torso belt as the trolley means moves along the track means, the hanger means comprises a catch depending from the track means, and the hanger engaging means comprises a flip hook hingedly attached at one of its ends to the torso belt on its track facing side, the flip hook in response to door opening movement passing through the "D" ring with its free end sequentially swinging upwardly from the torso belt surface, skimming past the catch and, as the hinged end passes over the "D" ring roller, swinging downwardly into engagement with the catch to hold the belt segment in raised position.

4. A passive belt system according to claim 3, in which:

the hanger means catch is positioned in offset relation to the longitudinal axis of the track means to prevent interference with the trolley means as the latter passes back and forth in response to door closing and door opening movement.

5. A passive belt system according to claim 4, in which:

the flip hook comprises a stiffly resilient plastic planar member having a width substantially equal to the width of the torso belt and a thickness less than the thickness of the torso belt.

* * * * *